(12) United States Patent
Rambo et al.

(10) Patent No.: US 12,359,612 B2
(45) Date of Patent: Jul. 15, 2025

(54) TURBINE ENGINE WITH THREE AIR STREAMS

(71) Applicant: General Electric Company, Schenectady, NY (US)

(72) Inventors: Jeffrey D. Rambo, Mason, OH (US); Bhaskar Nanda Mondal, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/417,814

(22) Filed: Jan. 19, 2024

(65) Prior Publication Data
US 2025/0129741 A1    Apr. 24, 2025

(30) Foreign Application Priority Data

Oct. 18, 2023 (IN) .............................. 202311070816

(51) Int. Cl.
*F02C 3/30* (2006.01)
*F02K 3/077* (2006.01)
*F01D 25/32* (2006.01)

(52) U.S. Cl.
CPC .............. *F02C 3/305* (2013.01); *F02K 3/077* (2013.01); *F01D 25/32* (2013.01)

(58) Field of Classification Search
CPC .......... F02C 3/305; F01K 23/06; F01K 23/10; F01K 23/101; F01K 23/103;
(Continued)

(56) References Cited

U.S. PATENT DOCUMENTS

| 5,896,740 A | 4/1999 | Shouman |
| 7,000,404 B2 | 2/2006 | Palmisano et al. |

(Continued)

FOREIGN PATENT DOCUMENTS

| EP | 4279718 A1 | 11/2023 |
| FR | 3127269 A1 | 3/2023 |

(Continued)

OTHER PUBLICATIONS

Slides from Sustainable Water-Injecting Turbofan Comprising Hybrid-Electrics (SWITCH) Introduction at the 2023 NPSS Annual Consortium Meeting, Mar. 10, 2023.
(Continued)

*Primary Examiner* — Lorne E Meade
*Assistant Examiner* — Alyson Joan Harrington
(74) *Attorney, Agent, or Firm* — Venable LLP; David D. Leege; Michele V. Frank (57) ABSTRACT

A turbine engine includes a cooling air duct for cooling air positioned radially between a core air flow path for core air and a bypass airflow passage for bypass air. A heat exchanger is positioned in the cooling air duct to transfer heat from a heat source from within the turbine engine. The heat exchanger may be a condenser. The turbine engine may further include a steam system that extracts water from the combustion gases, vaporizes the water to generate steam, and injects the steam into the core air flow path, the steam system including the condenser to transfer heat from the combustion gases to the cooling air and to condense the water from the combustion gases. The turbine engine may further include a booster fan to increase the pressure of the cooling air and the core air.

20 Claims, 6 Drawing Sheets

(58) Field of Classification Search
CPC .... F01K 23/105; F01K 23/106; F01K 23/108; F02K 3/00; F02K 3/02; F02K 3/025; F02K 3/04; F02K 3/06; F02K 3/068; F02K 3/08; F02K 3/105; F02K 3/115

See application file for complete search history.

(56) References Cited

U.S. PATENT DOCUMENTS

| | | | |
|---|---|---|---|
| 8,776,952 | B2 | 7/2014 | Schwarz et al. |
| 9,046,037 | B2 | 6/2015 | Broesamle et al. |
| 9,341,113 | B2 | 5/2016 | John et al. |
| 10,207,809 | B2 | 2/2019 | Koerner et al. |
| 10,364,750 | B2 | 7/2019 | Rambo |
| 11,391,211 | B2 | 7/2022 | Smith et al. |
| 11,492,918 | B1 | 11/2022 | Ostdiek |
| 11,603,798 | B1 | 3/2023 | Terwilliger et al. |
| 2021/0207500 | A1 | 7/2021 | Klingels et al. |
| 2023/0043809 | A1 | 2/2023 | Schimmels et al. |
| 2023/0132248 | A1 | 4/2023 | MacDonald et al. |
| 2023/0323814 | A1 | 10/2023 | Terwilliger et al. |
| 2023/0374938 | A1* | 11/2023 | Staubach ............... F02C 3/22 |
| 2023/0407768 | A1* | 12/2023 | Staubach ............ B01D 53/265 |
| 2024/0271550 | A1* | 8/2024 | Terwilliger ............. F01K 11/02 |

FOREIGN PATENT DOCUMENTS

| | | |
|---|---|---|
| FR | 3130896 A1 | 6/2023 |
| FR | 3130897 A1 | 6/2023 |
| FR | 3133367 A1 | 9/2023 |
| FR | 3133368 A1 | 9/2023 |

OTHER PUBLICATIONS

Davis et al., "Energy Efficient Engine: Flight Propulsion System Final Design and Analysis," General Electric Company, Prepared for National Aeronautics and Space Administration, Aug. 1985.

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

* cited by examiner

TURBINE ENGINE WITH THREE AIR STREAMS

CROSS REFERENCE TO RELATED APPLICATIONS

The present application claims the benefit of Indian Patent Application number 202311070816, filed on Oct. 18, 2023, which is hereby incorporated by reference herein in its entirety.

TECHNICAL FIELD

The present disclosure relates generally to turbine engines, particularly, high bypass turbine engines for aircraft.

BACKGROUND

Turbine engines used in aircraft generally include a fan and a core section arranged in flow communication with one another. A combustor is arranged in the core section to generate combustion gases for driving a turbine in the core section of the turbine engine and the turbine may be used to drive the fan. A portion of air flowing into the fan flows through the core section as core air and another portion of the air flowing into the fan bypasses the core section and flows through the turbine engine as bypass air.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

References to "inner" and "outer" when discussed in the context of radial directions refer to positions relative to the longitudinal centerline of the component.

As used herein, a "pressure ratio" of a fan, a compressor, or a turbine is a ratio of an exit pressure at an exit of the fan, the compressor, or the turbine to an inlet pressure at an inlet of the fan, the compressor, or the turbine, respectively. The exit pressure and the inlet pressure are measured as static air pressures perpendicular to the direction of the air flow through the fan, the compressor, or the turbine.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section to generate combustion gases for driving a turbine in the core section of the turbine engine. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. After flowing through the steam turbine, the steam may be injected into the combustor. The steam system extracts water from the combustion gases and vaporizes the water to generate steam. The steam system may include a condenser to transfer heat from the combustion gases to a cooling fluid and to condense the water from the combustion gases.

Also, as noted above, the turbine engine may include a fan driven by the core section of the turbine engine. Only some of the air flowing into the fan flows through the core section (i.e., core air). The remaining air bypasses the core section, flowing through the turbine engine as bypass air. This bypass air may generate a significant amount of the thrust produced by the turbine engine, such as, for example, at least seventy percent (70%) of the thrust. The bypass air may be used as the cooling fluid for the condenser, and, thus, the condenser may be positioned in the bypass air flow passage for the bypass air to flow therethrough. Locating the condenser in the bypass air, however, increases the resistance for the bypass air to flow, and, thus, may reduce the efficiency and the thrust of the turbine engine. In embodiments discussed herein, the turbine engine includes an airstream separate from the bypass air that is used as cooling air to cool the condenser, allowing bypass air to flow through the bypass airflow passage with minimal impediments. The turbine engine may, thus, have three air streams, one for the core air, one for the bypass air, and a third for cooling air used to cool the condenser. To help overcome the pressure resistance in a cooling airflow passage for the cooling air, a booster fan may be positioned upstream of the condenser to further increase the pressure of the cooling air.

Figure 1:
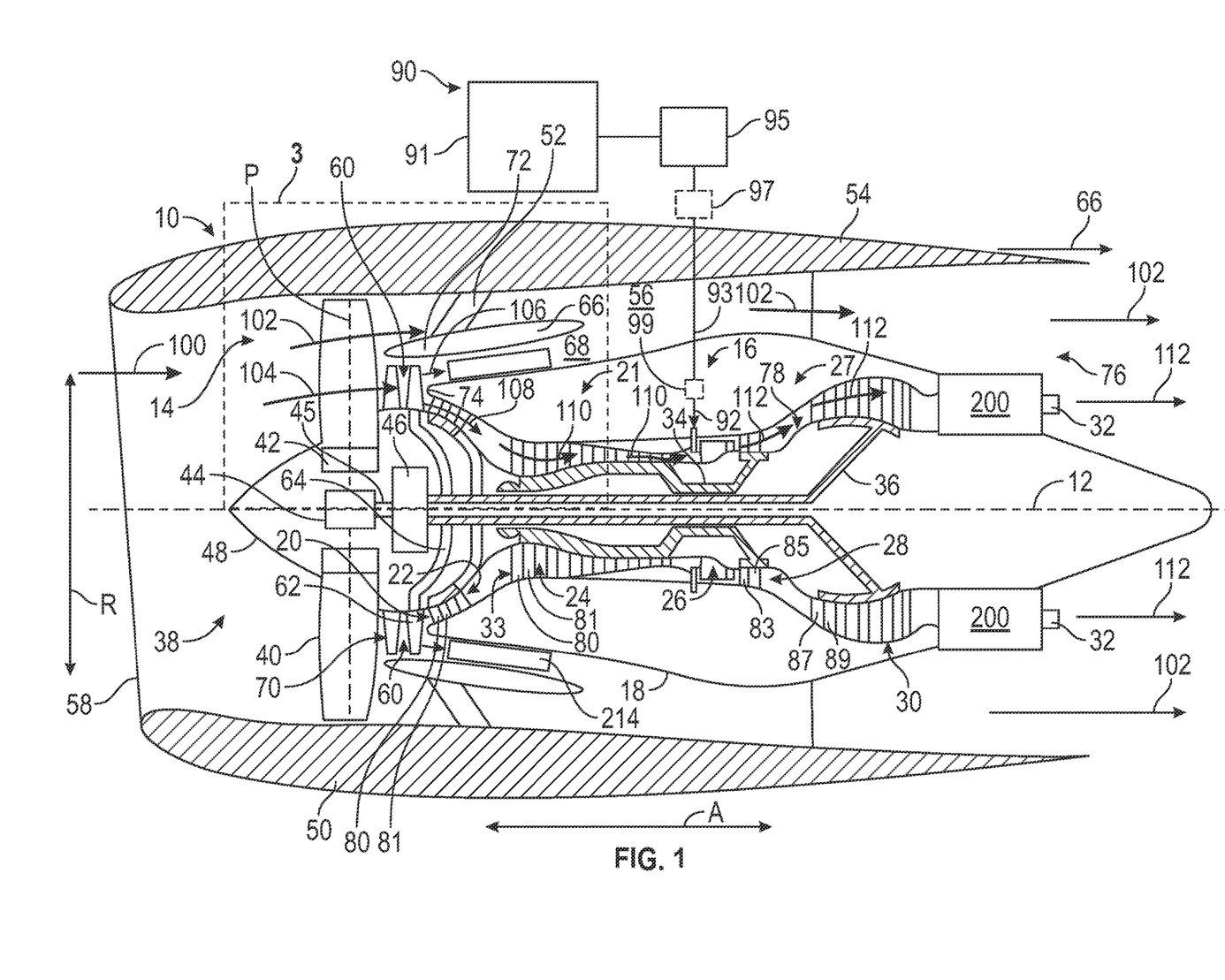
FIG. 1 is a schematic cross-sectional diagram of a turbine engine including a steam system, taken along a longitudinal centerline axis of the turbine engine, according to the present disclosure.

Referring now to the drawings, FIG. 1 is a schematic cross-sectional diagram of a turbine engine 10 including a steam system 200, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a turbo-engine 16 disposed downstream from the fan section 14.

The turbo-engine 16 includes an outer casing 18 that is substantially tubular and defines an annular inlet 20. As schematically shown in FIG. 1, the outer casing 18 encases, in serial flow relationship, a compressor section 21 including a low-pressure compressor (LPC) 22 followed downstream by a high-pressure compressor (HPC) 24, a combustor 26, a turbine section 27, including a high-pressure turbine (HPT) 28, followed downstream by a low-pressure turbine (LPT) 30, and one or more core exhaust nozzles 32. A high-pressure (HP) shaft 34 or a spool drivingly connects the HPT 28 to the HPC 24 to rotate the HPT 28 and the HPC 24 in unison. A low-pressure (LP) shaft 36 drivingly connects the LPT 30 to the LPC 22 or to rotate the LPT 30 and the LPC 22 in unison. The compressor section 21, the combustor 26, the turbine section 27, and the one or more core exhaust nozzles 32 together define a core air flow path 33.

For the embodiment depicted in FIG. 1, the fan section 14 includes a fan (referred to herein as a primary fan 38) having a plurality of fan blades (i.e., primary fan blades 40) coupled to a disk 42 in a spaced apart manner. As depicted in FIG. 1, the primary fan blades 40 extend outwardly from the disk 42 generally along the radial direction R. Each primary fan blade 40 is rotatable relative to the disk 42 about a pitch axis P by virtue of the primary fan blades 40 being operatively coupled to an actuator 44 configured to collectively vary the pitch of the primary fan blades 40 in unison. The primary fan blades 40, the disk 42, and the actuator 44 are together rotatable about the longitudinal centerline axis 12 via a fan shaft 45 that is powered by the LP shaft 36 across a power gearbox, also referred to as a gearbox assembly 46.

The gearbox assembly 46 is shown schematically in FIG. 1. The gearbox assembly 46 includes a plurality of gears for adjusting the rotational speed of the fan shaft 45 and, thus, the rotational speed of the primary fan 38 relative to the rotational speed of the LP shaft 36. The gearbox assembly 46 has an input shaft, which, in this embodiment, is the LP shaft 36, and an output shaft, which, in this embodiment, is the fan shaft 45. The gearbox assembly 46 thus reduces the speed of the output shaft relative to the input shaft and, in this embodiment, reduces the speed of the fan shaft 45 relative to the LP shaft 36.

Referring still to the exemplary embodiment of FIG. 1, the disk 42 is covered by a rotatable fan hub 48 aerodynamically contoured to promote an airflow through the plurality of primary fan blades 40. In addition, the fan section 14 includes an annular fan casing or a nacelle 50 that circumferentially surrounds the primary fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 to define a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50. Further arrangements of the core exhaust nozzles 32 are described further below.

For the embodiment depicted in FIG. 1, the fan section 14 also includes a booster fan 60 having a plurality of fan blades (i.e., booster fan blades 62) coupled to a disk 64 in a spaced apart manner. As depicted in FIG. 1, the booster fan blades 62 extend outwardly from the disk 64 generally along the radial direction R. As depicted in FIG. 1, the booster fan blades 62 are fixed-pitch fan blades, but alternatively, the booster fan blades 62 may be variable-pitch fan blades that are adjustable by an actuator in the manner described above for the primary fan 38. The booster fan blades 62 and the disk 64 are together rotatable about the longitudinal centerline axis 12 via a shaft, which, as depicted in FIG. 1, is the LP shaft 36. An annular booster fan casing or a cooling air casing 66 circumferentially surrounds the booster fan 60 and/or at least a portion of the turbo-engine 16. The cooling air casing 66 extends over an outer portion of the turbo-engine 16 to define a cooling airflow passage or a cooling air duct 68 therebetween. The cooling air duct 68 is thus defined radially between the core air flow path 33 and the bypass airflow passage 56. The booster fan 60 and the cooling air duct 68 will be discussed in more detail below.

During operation of the turbine engine 10, a volume of air 100 enters the turbine engine 10 through an inlet 58 of the nacelle 50 and/or the fan section 14. As the volume of air 100 passes across the primary fan blades 40, a first portion of air (bypass air 102) is directed or is routed into the bypass airflow passage 56, and a second portion of air (secondary air 104) is directed or is routed into a secondary air inlet 70. The secondary air inlet 70 is an annular inlet defined by the cooling air casing 66 and, more specifically, a secondary air splitter 72. The secondary air inlet 70 and the secondary air splitter 72 are positioned downstream of the primary fan 38 and, more specifically, the primary fan blades 40 to split the volume of air 100 into the bypass air 102 and secondary air 104. The secondary air splitter 72 may be a forward portion of the cooling air casing 66.

After flowing through the booster fan 60, the secondary air 104 is directed (or split) by a core air splitter 74 into cooling air 106 and core air 108. The core air splitter 74 is thus downstream of the secondary air inlet 70 and may be a portion of the outer casing 18 defining the annular inlet 20. As will be discussed in more detail below, the cooling air 106 flows through the cooling air duct 68 and is used as a cooling fluid to receive heat from a heat source within the turbine engine 10. More specifically a heat exchanger, such as the condenser 214 of the steam system 200 (discussed further below) is positioned in the cooling air duct to transfer heat from a heat source, such as the combustion gases 112, from within the turbine engine 10 to the cooling air 106.

The core air 108 is directed by the core air splitter 74 into the upstream section of the core air flow path 33, or, more specifically, into the annular inlet 20 of the LPC 22. The pressure of the core air 108 is then increased by the LPC 22, generating compressed air 110, and the compressed air 110 is routed through the HPC 24 and further compressed before being directed into the combustor 26, where the compressed air 110 is mixed with fuel 92 and burned to generate combustion gases 112 (i.e., combustion products). One or more stages may be used in each of the LPC 22 and the HPC 24, with each subsequent stage further compressing the compressed air 110. Each stage may include a plurality of circumferentially spaced compressor stator vanes 80 that are coupled to the outer casing 18, and compressor rotor blades 81 that are coupled to the LP shaft 36 or the HP shaft 34 to be rotated by the LP shaft 36 or the HP shaft 34. The compression ratio is a ratio of a pressure of a last stage of the HPC 24 to a pressure of a first stage of the HPC 24.

The combustion gases 112 are routed into the HPT 28 and expanded through the HPT 28 where a portion of thermal energy and/or kinetic energy from the combustion gases 112 is extracted via sequential stages of HPT stator vanes 83 that are coupled to the outer casing 18 and HPT rotor blades 85 that are coupled to the HP shaft 34, thus, causing the HP shaft 34 to rotate, thereby supporting operation of the HPC 24. The combustion gases 112 are then routed into the LPT 30 and expanded through the LPT 30. Here, a second portion of the thermal energy and/or the kinetic energy is extracted from the combustion gases 112 via sequential stages of LPT stator vanes 87 that are coupled to the outer casing 18 and LPT rotor blades 89 that are coupled to the LP shaft 36, thus, causing the LP shaft 36 to rotate, thereby supporting operation of the LPC 22 and rotation of the primary fan 38 via the gearbox assembly 46. One or more stages may be used in each of the HPT 28 and the LPT 30.

The combustion gases 112 are subsequently routed through the one or more core exhaust nozzles 32 of the turbo-engine 16 to provide propulsive thrust. Simultaneously with the flow of the core air 108 through the core air flow path 33, the bypass air 102 is routed through the bypass airflow passage 56 before being exhausted from a fan bypass nozzle 76 of the turbine engine 10, also providing propulsive thrust. The combustor 26, the HPT 28, the LPT 30, and the one or more core exhaust nozzles 32 at least partially define a hot gas path 78 for routing the combustion gases 112 through the turbo-engine 16.

As noted above, the compressed air 110 (i.e., the core air 108) is mixed with the fuel 92 in the combustor 26 to generate a fuel and air mixture, and combusted, generating combustion gases 112 (i.e., combustion products). The fuel 92 can include any type of fuel used for turbine engines, such as, for example, sustainable aviation fuels (SAF) including biofuels, JetA, or other hydrocarbon fuels. The fuel 92 also may be a hydrogen-based fuel ($H_2$), and, while hydrogen-based fuel may include blends with hydrocarbon fuels, the fuel 92 used herein is preferably unblended, and referred to herein as hydrogen fuel. In some embodiments, the hydrogen fuel may comprise substantially pure hydrogen molecules (i.e., diatomic hydrogen). The fuel 92 may also be a cryogenic fuel. For example, when the hydrogen fuel is used, the hydrogen fuel may be stored in a liquid phase at cryogenic temperatures.

The turbine engine 10 includes a fuel system 90 for providing the fuel 92 to the combustor 26. The fuel system 90 includes a fuel tank 91 for storing the fuel 92 therein, and a fuel delivery assembly 93. The fuel tank 91 can be located on an aircraft (not shown) to which the turbine engine 10 is attached. While a single fuel tank 91 is shown in FIG. 1, the fuel system 90 can include any number of fuel tanks 91, as desired. The fuel delivery assembly 93 delivers the fuel 92 from the fuel tank 91 to the combustor 26. The fuel delivery assembly 93 includes one or more lines, conduits, pipes, tubes, etc., configured to carry the fuel 92 from the fuel tank 91 to the combustor 26. The fuel delivery assembly 93 also includes a pump 95 to induce the flow of the fuel 92 through the fuel delivery assembly 93 to the combustor 26. In this way, the pump 95 pumps the fuel 92 from the fuel tank 91, through the fuel delivery assembly 93, and into the combustor 26.

In some embodiments, for example, when the fuel 92 is a hydrogen fuel, the fuel system 90 includes one or more vaporizers 97 (illustrated by dashed lines) and a metering valve 99 (illustrated by dashed lines) in fluid communication with the fuel delivery assembly 93. In this example, the hydrogen fuel is stored in the fuel tank 91 as liquid hydrogen fuel. The one or more vaporizers 97 heat the liquid hydrogen fuel flowing through the fuel delivery assembly 93. The one or more vaporizers 97 are positioned in the flow path of the fuel 92 between the fuel tank 91 and the combustor 26, and are located downstream of the pump 95. The one or more vaporizers 97 are in thermal communication with at least one heat source, such as, for example, waste heat from the turbine engine 10 and/or from one or more systems of the aircraft (not shown). The one or more vaporizers 97 heat the liquid hydrogen fuel and the liquid hydrogen fuel is converted into a gaseous hydrogen fuel within the one or more vaporizers 97. The fuel delivery assembly 93 directs the gaseous hydrogen fuel into the combustor 26.

The metering valve 99 is positioned downstream of the one or move vaporizers 97 and the pump 95. The metering valve 99 receives hydrogen fuel in a substantially completely gaseous phase, or in a substantially completely supercritical phase. The metering valve 99 provides the flow of fuel to the combustor 26 in a desired manner. More specifically, the metering valve 99 provides a desired volume of hydrogen fuel at, for example, a desired flow rate, to a fuel manifold that includes one or more fuel injectors that inject the hydrogen fuel into the combustor 26. The fuel system 90 can include any components for supplying the fuel 92 from the fuel tank 91 to the combustor 26, as desired.

The turbine engine 10 includes the steam system 200 in fluid communication with the one or more core exhaust nozzles 32. The steam system 200 extracts steam from the combustion gases 112 as the combustion gases 112 flow through the steam system 200, as detailed further below.

The turbine engine 10 depicted in FIG. 1 is by way of example only. In other exemplary embodiments, the turbine engine 10 may have any other suitable configuration. For example, in other exemplary embodiments, the primary fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

FIG. 2 is a schematic diagram of the turbine engine 10 and the steam system 200 of FIG. 1, according to the present disclosure For clarity, various features of the turbine engine 10 described and shown above are shown schematically in FIG. 2 and some components are not shown in FIG. 2, but the description of such components also applies here. The steam system 200 includes a boiler 212, a condenser 214, a water separator 216, a water pump 218, and a steam turbine 220.

Figure 2:
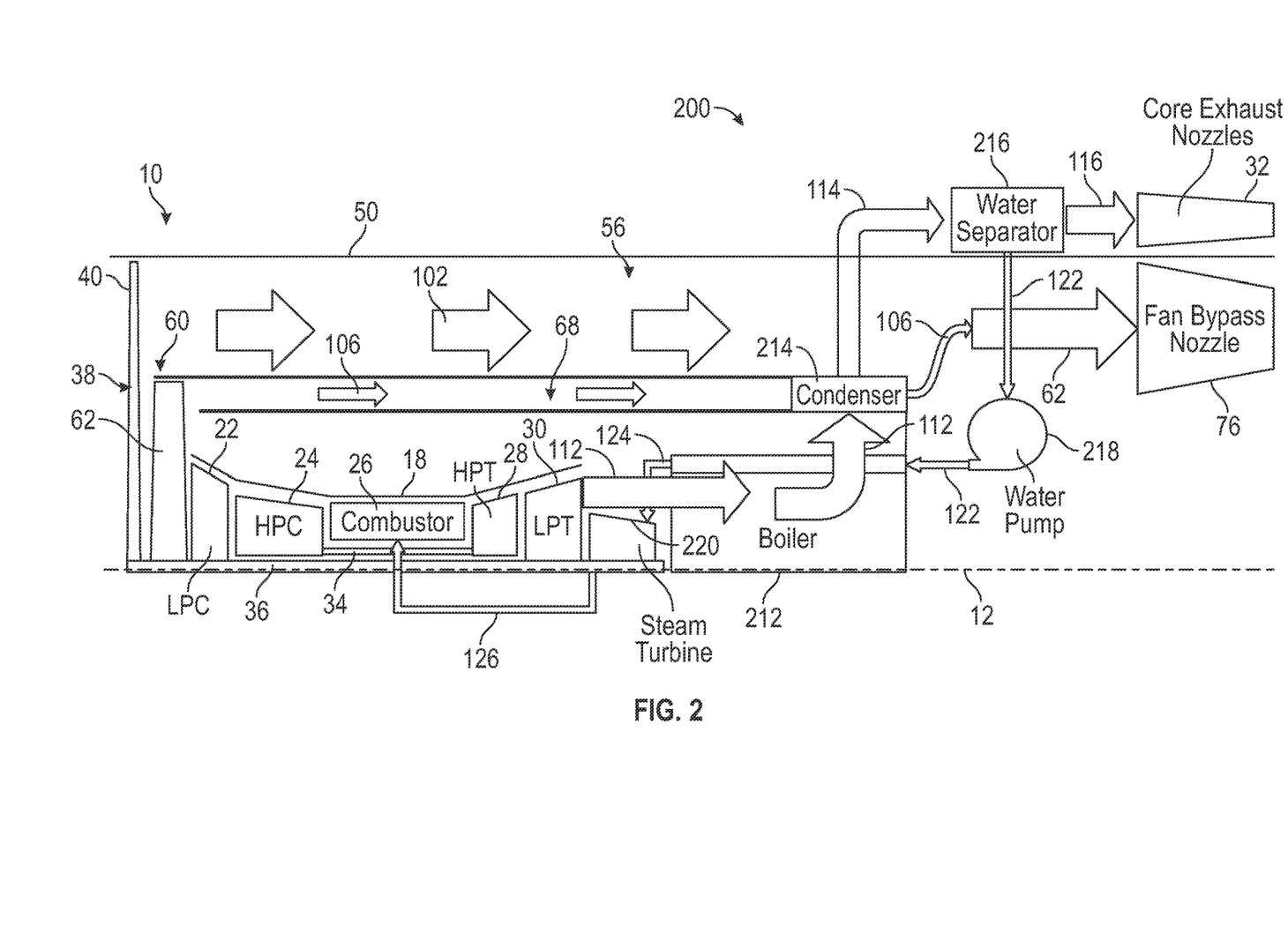
FIG. 2 is a schematic diagram of the turbine engine and a steam system according to an embodiment of the present disclosure.

The boiler 212 is a heat exchanger that vaporizes liquid water from a water source to generate steam or water vapor, as detailed further below. The boiler 212 is thus a steam source. In particular, the boiler 212 is an exhaust gas-water heat exchanger. The boiler 212 is in fluid communication with the hot gas path 78 (FIG. 1) and is positioned downstream of the LPT 30. The boiler 212 is also in fluid communication with the water pump 218, as detailed further below. The boiler 212 can include any type of boiler or heat exchanger for extracting heat from the combustion gases 112 and vaporizing liquid water into steam or water vapor as the liquid water and the combustion gases 112 flow through the boiler 212.

The condenser 214 is a heat exchanger that further cools the combustion gases 112 as the combustion gases 112 flow through the condenser 214, as detailed further below. In particular, the condenser 214 is an air-exhaust gas heat exchanger. The condenser 214 is in fluid communication with the boiler 212 and, in this embodiment, is positioned within the cooling air duct 68. The condenser 214 can include any type of condenser for condensing water from the exhaust (e.g., the combustion gases 112).

The water separator 216 is in fluid communication with the condenser 214 for receiving cooled exhaust (combustion gases 112) having condensed water entrained therein. The water separator 216 is also in fluid communication with the one or more core exhaust nozzles 32 and with the water pump 218. The water separator 216 includes any type of water separator for separating water from the exhaust. For example, the water separator 216 can include an inertial separator, such as a cyclonic separator that uses vortex separation to separate the water from the air. In such embodiments, the water separator 216 generates a cyclonic flow within the water separator 216 to separate the water from the cooled exhaust. In FIG. 2, the water separator 216 is schematically depicted as being in the nacelle 50, but the water separator 216 could be located at other locations within the turbine engine 10, such as, for example, radially inward of the nacelle 50, closer to the turbo-engine 16. The water separator 216 may be driven to rotate by one of the engine shafts, such as the HP shaft 34 or the LP shaft 36. As noted above, the boiler 212 receives liquid water from a water source to generate steam or water vapor. In the embodiment depicted in FIG. 2, the condenser 214 and the water separator 216, individually or collectively, are the water source for the boiler 212.

The water pump 218 is in fluid communication with the water separator 216 and with the boiler 212. The water pump 218 is in fluid communication with the condenser 214 via the water separator 216. The water pump 218 may be any suitable pump, such as a centrifugal pump or a positive displacement pump. The water pump 218 directs the flow of the water 122 through the boiler where it is converted back to the steam 124, 126. The steam 124, 126 is sent through the steam turbine then injected into the combustor 26.

In operation, the combustion gases 112, also referred to as exhaust, flow from the LPT 30 into the boiler 212. The combustion gases 112 transfer heat into the water 122 within the boiler 212, as detailed further below. The combustion gases 112 then flow into the condenser 214. The condenser 214 condenses the water 122 from the combustion gases 112. The cooling air 106 flows through the cooling air duct 68 and over or through the condenser 214 and extracts heat from the combustion gases 112, cooling the combustion gases 112 and condensing the water 122 from the combustion gases 112, to generate an exhaust-water mixture 114. As will be discussed in more detail below, the cooling air 106 is then exhausted out of the turbine engine 10 through the fan bypass nozzle 76 (or other outlets) to generate thrust. The condenser 214 thus may be positioned in the cooling air duct 68.

The exhaust-water mixture 114 flows into the water separator 216. The water separator 216 separates the water 122 from the exhaust of the exhaust-water mixture 114 to generate separate exhaust 116 and the water 122. The exhaust 116 is exhausted out of the turbine engine 10 through the one or more core exhaust nozzles 32 to generate thrust, as detailed above. The boiler 212, the condenser 214, and the water separator 216 thus also define a portion of the hot gas path 78 (FIG. 1) for routing the combustion gases 112, the exhaust-water mixture 114, and the exhaust 116 through the steam system 200 of the turbine engine 10.

The water pump 218 pumps the water 122 through one or more water lines (as indicated by the arrow for the water 122 in FIG. 2) and the water 122 flows through the boiler 212. As the water 122 flows through the boiler 212, the combustion gases 112 flowing through the boiler 212 transfer heat into the water 122 to vaporize the water 122 and to generate the steam 124. The steam turbine 220 includes one or more stages of steam turbine blades (not shown) and steam turbine stators (not shown). The steam 124 flows from the boiler 212 into the steam turbine 220, through one or more steam lines (as indicated by the arrow for the steam 124 in FIG. 2), causing the steam turbine blades of the steam turbine 220 to rotate, thereby generating additional work in an output shaft connected to the turbine blades of the steam turbine 220.

As noted above, the turbo-engine 16 includes shafts, also referred to as engine shafts, coupling various rotating components of the turbo-engine 16 and other thrust producing components such as the primary fan 38. In the turbo-engine 16 shown in FIG. 1, these engine shafts include the HP shaft 34 and the LP shaft 36. The steam turbine 220 is coupled to one of the engine shafts of the turbo-engine 16, such as the HP shaft 34 or the LP shaft 36. In the illustrated embodiment, the steam turbine 220 is coupled to the LP shaft 36. As the steam 124 flows from the boiler 212 through the steam turbine 220, the kinetic energy of this gas is converted by the steam turbine 220 into mechanical shaft work in the LP shaft 36. The reduced temperature steam (as steam 126) exiting the steam turbine 220 is then injected into the core air flow path 33, such as into the combustor 26, upstream of the combustor 26, or downstream of the combustor 26. The steam 126 injected into the core air flow path 33 adds mass flow to the core air 108 such that less core air 108 is needed to produce the same amount of work through the turbine section 27. In this way, the steam system 200 extracts additional work from the heat in the exhaust gas that would otherwise be wasted.

Figure 3:
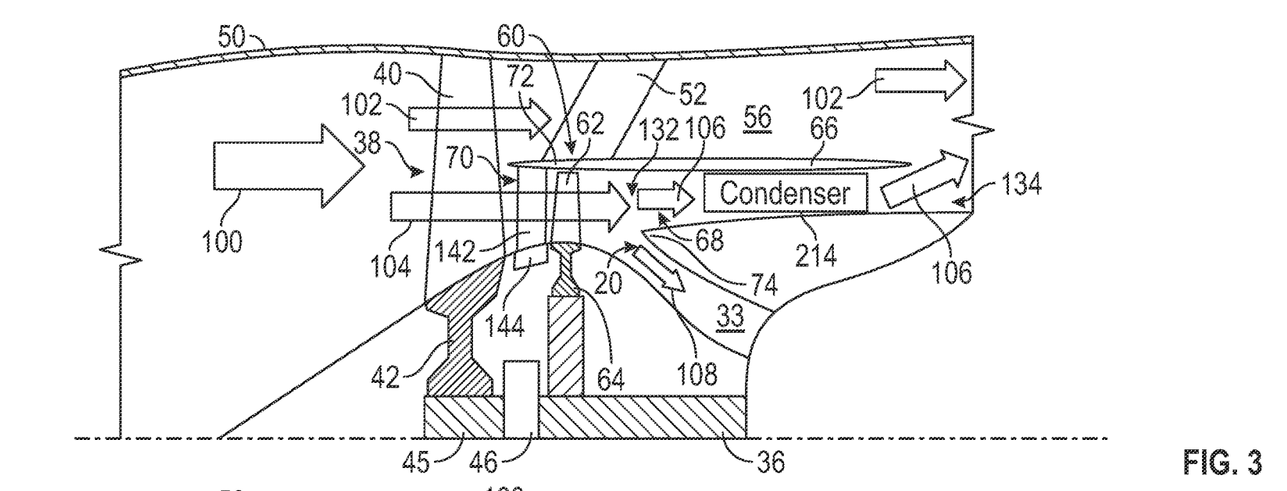
FIG. 3 is a schematic cross-sectional diagram of a portion of a forward end of the turbine engine of FIG. 1, showing detail 3 in FIG. 1, according to an embodiment of the present disclosure.

FIG. 3 is a schematic cross-sectional diagram of a forward end of the turbine engine 10, showing detail 3 in FIG. 1, according to the present disclosure. As discussed above, a portion of the volume of air 100 flowing into the inlet 58 (see FIG. 1) may be used to cool the combustion gases 112 (FIG. 2) and to condense (extract) water from the combustion gases 112 to generate the exhaust-water mixture 114. The bypass air 102 may be used as cooling air flowing through the condenser 214, but if the condenser 214 is positioned within the bypass airflow passage 56, the condenser 214 creates a flow restriction within the bypass airflow passage 56 and may reduce the efficiency or the thrust of the turbine engine 10. For example, additional pressure may need to be generated by the primary fan 38 to overcome the restriction (pressure drop) caused by the condenser 214. This additional pressure, however, may be counter to the efficient operation of the turbine engine 10 where moving a large volume of bypass air 102 at low pressures is preferred. Accordingly, in the embodiments discussed herein, a separate portion of the volume of air 100 flowing into the primary fan 38 is directed through a separate (third) airflow passage (cooling air duct 68) to be used as the cooling air 106 for the condenser 214.

The cooling air duct 68 includes a cooling air inlet 132 and a cooling air outlet 134. After flowing through the cooling air inlet 132, the cooling air 106 is heated by the condenser 214 by absorbing heat from the condenser 214. The cooling air outlet 134 is positioned downstream of the condenser 214 to discharge the cooling air 106 from the cooling air duct 68. In the embodiment shown in FIG. 3, the cooling air outlet 134 is positioned to discharge the cooling air 106 into the bypass airflow passage 56, and the cooling air outlet 134 is thus located upstream of the fan bypass nozzle 76 (see FIG. 1)

To overcome the increased flow resistance (pressure drop) from the condenser 214, the pressure of the cooling air 106 is preferably increased by the booster fan 60 relative to the pressure of the bypass air 102. The booster fan 60 may be sized to overcome the pressure drop from the condenser 214 (and any other components located within the cooling air duct 68). The booster fan 60 may have, for example, a pressure ratio from 1.1 to 1.7. As will be discussed further below, the booster fan blades 62 are coupled to a drive shaft (also referred to herein as a booster fan shaft), and the booster fan 60 may have a pressure ratio from 1.1 to 1.3 when coupled to the same drive shaft as the primary fan 38 or a pressure ratio from 1.3 to 1.7 when coupled to a different drive shaft than the primary fan 38.

Each of the booster fan blades 62 has a length that is less than the length of each of the primary fan blades 40. More specifically, each primary fan blade 40 includes an airfoil having a blade length from a root end of the airfoil to a tip end of the airfoil. Similarly, each booster fan blade 62 includes an airfoil having a blade length from a root end of the airfoil to a tip end of the airfoil. The blade length of the booster fan blades 62 may be from three percent (3.0%) to forty-one and six tenths percent (41.6%) of the blade length of the primary fan blades 40.

In operation, the secondary air 104 flows into the secondary air inlet 70 defined by the cooling air casing 66 and, more specifically, the secondary air splitter 72, and then, the pressure of the secondary air 104 is increased. Although other arrangements of the booster fan 60 may be used, the secondary air 104 includes both the cooling air 106 and the core air 108, and the booster fan 60 may be used to increase the pressure of the core air 108 prior to the pressure of the core air 108 being increased in the compressor section 21 (see FIG. 1) of the turbo-engine 16 by the LPC 22 and the HPC 24 (see FIG. 1). The core air splitter 74 thus is downstream of the booster fan 60. The core air splitter 74 defines the cooling air inlet 132 with the cooling air casing 66.

To help direct the flow of the secondary air 104 into the booster fan 60 and, more specifically, the booster fan blades 62, the booster fan 60 may also include a plurality of inlet guide vanes 142. The inlet guide vanes 142 may be located in the secondary air inlet 70, and may be circumferentially spaced. The inlet guide vanes 142 may be variable inlet guide vanes that are movable to control the volume of air flowing into the secondary air inlet 70 (i.e., movable to control the volume of the secondary air 104). More specifically, the plurality of inlet guide vanes 142 may be operatively coupled to one or more actuators 144 configured to vary the pitch of a corresponding inlet guide vane 142. The actuator 144 may be operatively coupled to the plurality of inlet guide vanes 142 to collectively vary the pitch of the inlet guide vanes 142 in unison.

As discussed above, each of the booster fan blades 62 is attached to the disk 64. The disk 64 is connected to a drive shaft (also referred to herein as a booster fan shaft), and as the drive shaft is rotated, the disk 64 and the booster fan blades 62 are driven to rotate at a rotation speed, producing the increase in pressure discussed above. In the embodiment shown in FIG. 3, the booster fan shaft is on the input side of the gearbox assembly 46. More specifically, the drive shaft of the booster fan 60 (booster fan shaft) is the LP shaft 36. The primary fan 38 is connected to the fan shaft 45, which is located on the output side of the gearbox assembly 46 to rotate at a rotation speed. With the booster fan 60 connected to the input side of the gearbox assembly 46 and the primary fan 38 connected to the output side of the gearbox assembly 46, the primary fan blades 40 rotate at a rotation speed less than the rotation speed of the booster fan blades 62. With the booster fan blades 62 connected on the input side of the gearbox assembly 46 and, more specifically, to the LP shaft 36, the booster fan 60 may have a pressure ratio from 1.3 to 1.7.

Figure 4:
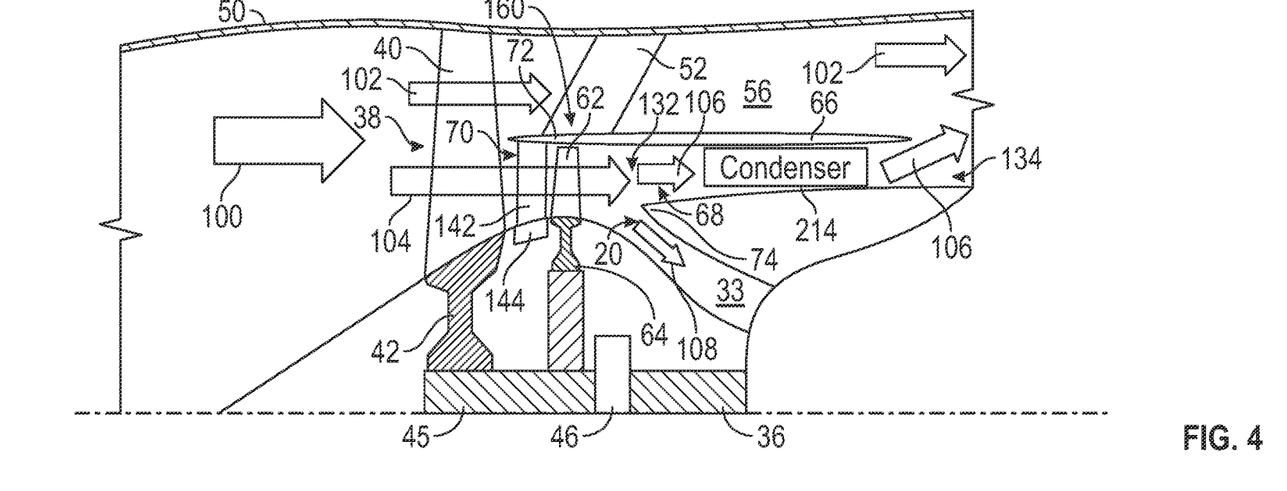
FIG. 4 is a schematic cross-sectional diagram of a portion of a forward end of a turbine engine, taken from a perspective similar to detail 3 in FIG. 1, according to another embodiment of the present disclosure.

FIG. 4 is a schematic cross-sectional diagram of a portion of a forward end of the turbine engine, taken from a perspective similar to detail 3 in FIG. 1, showing a booster fan 160 according to another embodiment of the present disclosure. The configuration of the turbine engine shown in FIG. 4 is similar to the configuration discussed above with reference to FIG. 3. The same reference numerals will be used for components and features of this embodiment that are the same as or similar to the components and features discussed above. The description of these components above also applies to this embodiment, and a detailed description of these components and features is omitted here. In the embodiment shown in FIG. 3, the primary fan 38 and the booster fan 60 are attached on different sides (different drive shafts) of the gearbox assembly 46 to rotate at different speeds. In this embodiment, the primary fan 38 and the booster fan 160 are connected to the same drive shaft and, more specifically, the fan shaft 45. The primary fan 38 and the booster fan 160, thus, rotate at the same speeds. With the booster fan blades 62 connected to the fan shaft 45, the booster fan 160 may have a pressure ratio from 1.1 to 1.3.

Figure 5:
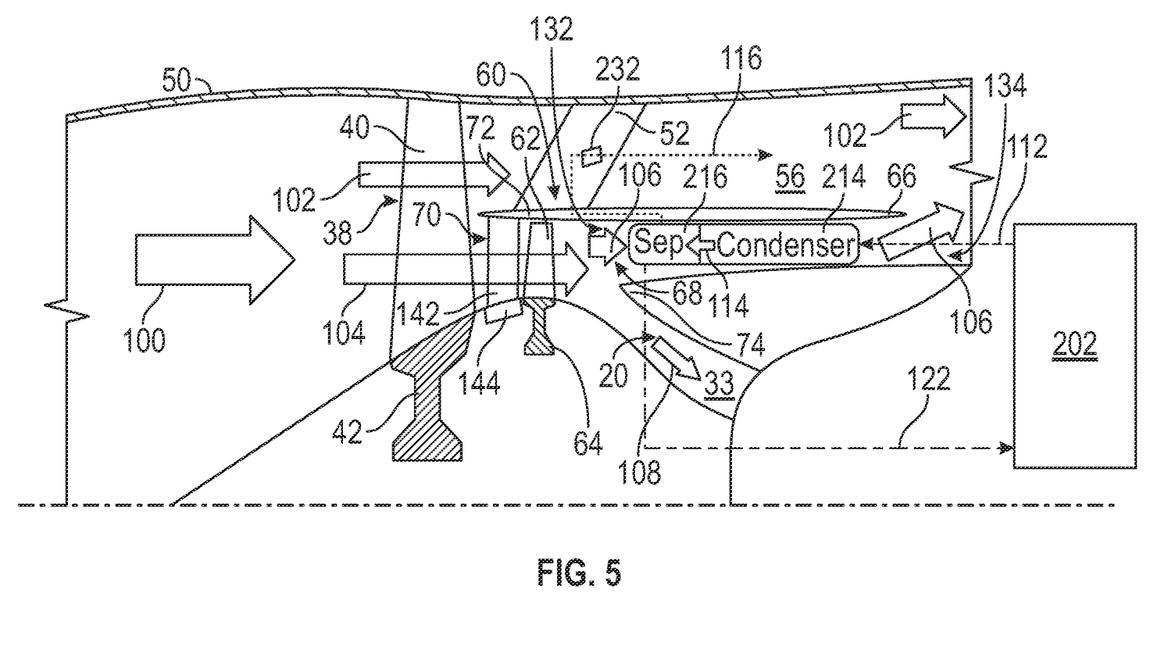
FIG. 5 is a schematic cross-sectional diagram of a portion of a forward end of a turbine engine, taken from a perspective similar to detail 3 in FIG. 1, according to another embodiment of the present disclosure.

FIG. 5 is a schematic cross-sectional diagram of a portion of a forward end of the turbine engine, taken from a perspective similar to detail 3 in FIG. 1, showing a steam system 202 according to another embodiment of the present disclosure. The steam system 202 shown in FIG. 5 is similar to the steam system 200 discussed above with reference to FIGS. 1 to 4. The same reference numerals will be used for components and features of this embodiment that are the same as or similar to the components and features discussed above. The description of these components above also applies to this embodiment, and a detailed description of these components and features is omitted here. In the embodiments illustrated above, the combustion gases 112 are exhausted from the turbine engine 10 with a nozzle separate from the fan bypass nozzle 76. In this embodiment, however, the combustion gases 112 and, more specifically the low moisture content exhaust 116 may be discharged from exhaust nozzles 232 into the bypass air 102. The exhaust nozzles 232 may thus be positioned within the bypass airflow passage 56, such as in a downstream portion of the outlet guide vanes 52 to discharge the exhaust 116 in a downstream direction relative to the flow of the bypass air 102 in the bypass airflow passage 56.

The condenser 214 of this embodiment may be arranged in a counter flow arrangement with the cooling air 106. More specifically, the cooling air 106 flows from the cooling air inlet 132 to the cooling air outlet 134 in a direction generally from forward to aft of the turbine engine 10, and the combustion gases 112 flow through the condenser 214 generally in a direction from aft to forward. The water separator 216 may thus be positioned on the upstream side of the condenser 214 relative to the flow of the cooling air 106 within the cooling air duct 68 to receive the exhaust-water mixture 114 from the condenser 214. After the water 122 is separated within the water separator 216, the water 122 flows back to the boiler 212 (see FIG. 2) of the steam system 202, and the exhaust 116 is discharged from the exhaust nozzles 232 as discussed above.

Figure 6:
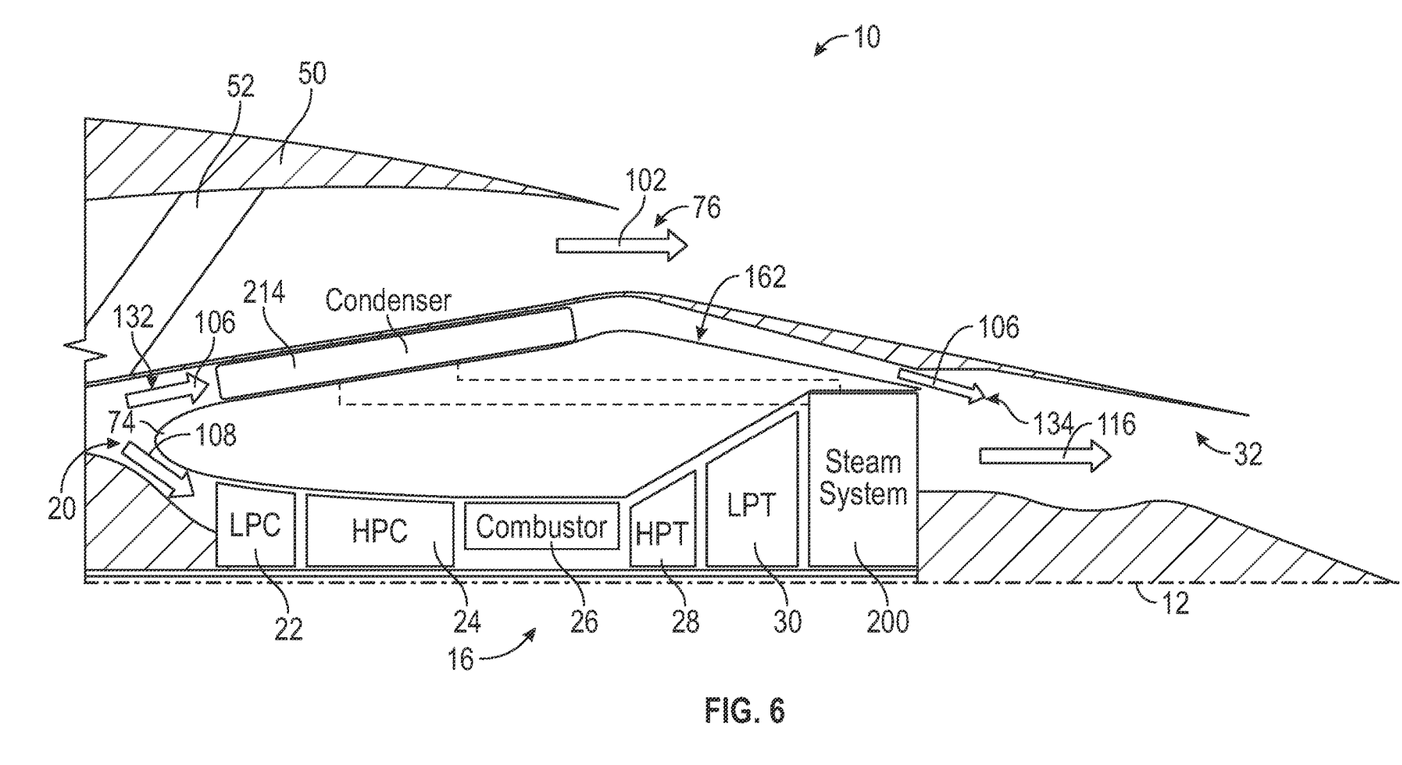
FIG. 6 is a schematic cross-sectional diagram of a portion of an aft end of a turbine engine according to another embodiment of the present disclosure.

FIG. 6 is a schematic cross-sectional diagram of a portion of an aft end of the turbine engine 10, showing a cooling air duct 162 according to another embodiment of the present disclosure. The turbine engine 10 and the cooling air duct 162 shown in FIG. 6 are similar to the turbine engine 10 and the cooling air duct 68 discussed above with reference to FIGS. 1 and 2 and any one of FIGS. 3 to 5. The same reference numerals will be used for components and features of this embodiment that are the same as or similar to the components and features discussed above. The description of these components above also applies to this embodiment, and a detailed description of these components and features is omitted here.

In the embodiments illustrated above, the cooling air outlet 134 discharges the cooling air 106 into the bypass airflow passage 56. The cooling air outlet 134 may, however, be positioned to discharge the cooling air 106 to other locations within the turbine engine 10. In the embodiment depicted in FIG. 6, the cooling air outlet 134 is located such that the cooling air 106 flows into and/or is discharged into the core air flow path 33, such as into the hot gas path 78. The cooling air outlet 134 is depicted in FIG. 6 as being located to discharge the cooling air 106 downstream of the LPT 30 and downstream of the steam system 200. For example, the cooling air 106 may be discharged into the exhaust 116 and then, the combination of the cooling air 106 and the exhaust 116 is exhausted from the turbine engine 10 by the core exhaust nozzles 32. Additionally or alternatively, the cooling air 106, after flowing through the condenser 214, may be used as cooling air for various other components within the turbine engine 10 and, more specifically, the turbo-engine 16 such that the cooling air 106 is discharged into other portions of the hot gas path 78 (FIG. 1).

Figure 7:
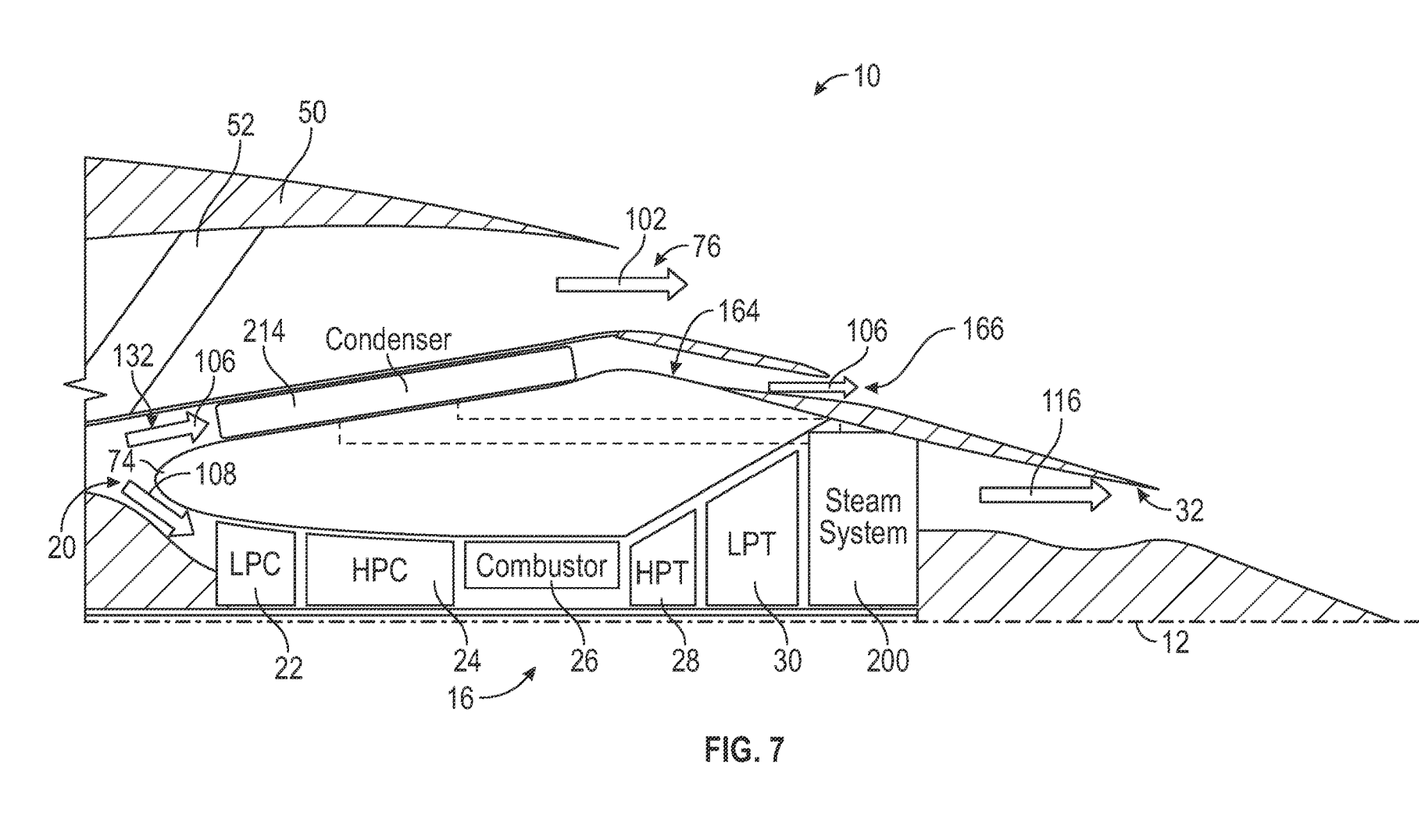
FIG. 7 is a schematic cross-sectional diagram of a portion of an aft end of a turbine engine according to another embodiment of the present disclosure.

FIG. 7 is a schematic cross-sectional diagram of a portion of an aft end of the turbine engine 10, showing a cooling air duct 164 according to another embodiment of the present disclosure. The turbine engine 10 and the cooling air duct 164 shown in FIG. 7 is similar to the turbine engine 10 and the cooling air duct 68 discussed above with reference to FIGS. 1 and 2 and any one of FIGS. 3 to 5. The same reference numerals will be used for components and features of this embodiment that are the same as or similar to the components and features discussed above. The description of these components above also applies to this embodiment, and a detailed description of these components and features is omitted here.

In the embodiments illustrated above, the cooling air outlet 134 discharges the cooling air 106 into a flow passage of the turbine engine 10 such as the bypass airflow passage 56 (see FIGS. 1 to 5) or the core air flow path 33 (see FIG. 6). The cooling air 106 may, however, be discharged separately from these airflow passages. The cooling air duct 164 of this embodiment thus includes a cooling air exhaust nozzle 166. The cooling air exhaust nozzle 166 is separate from the fan bypass nozzle 76 and the at least one core exhaust nozzle 32, and, thus, the cooling air 106 is exhausted from the cooling air duct 164 separately from the bypass air 102 and the exhaust 116.

The turbine engines discussed herein include a third flow path or a separate flow path or a passage (i.e., the cooling air duct 68) for cooling air 106 used to cool a heat exchanger, such as the condenser 214 of the steam system 200. With the cooling air 106 flowing separately from the bypass air 102, the bypass air 102 can flow unimpeded by the condenser 214 and a booster fan 60, 160 can be used to provide the pressure rise to only a portion of the air bypassing the turbo-engine 16. Such arrangements provide for increased efficiency and bypass thrust from the turbine engine 10, as compared to arrangements with the condenser 214 positioned in the bypass airflow passage 56 and impeding the flow of the bypass air 102.

Further aspects of the present disclosure are provided by the subject matter of the following clauses.

A turbine engine comprising a fan, a turbo-engine, a nacelle that circumferentially surrounds the fan, a cooling air duct, and a steam system. The fan includes a plurality of fan blades that rotates to increase the pressure of a volume of air.

The turbo-engine includes a combustor, a turbine, and a core air flow path. The combustor combusts compressed air and fuel to generate combustion gases. The turbine includes a turbine shaft. The fan is coupled to the turbine shaft such that rotation of the turbine causes the fan to rotate. The core air flow path is at least partially defined by the combustor and the turbine. The nacelle defines a bypass airflow passage between the nacelle and the turbo-engine. The cooling air duct is defined radially between the core air flow path and the bypass airflow passage. The volume of air from the fan is split and flows into the bypass airflow passage as bypass air, flows into the cooling air duct as cooling air, and flows into the core air flow path as core air. The steam system extracts water from the combustion gases, vaporizes the water to generate steam, and injects the steam into the core air flow path, the steam system including a condenser positioned in the cooling air duct to transfer heat from the combustion gases to the cooling air and to condense the water from the combustion gases.

The turbine engine of the preceding clause, wherein the shaft is a low-pressure shaft and the turbine is a low-pressure turbine.

The turbine engine of any preceding clause, wherein the turbo-engine further includes a compressor that compresses the core air to generate the compressed air, the compressor being coupled to the turbine shaft and defining a portion of the core air flow path.

The turbine engine of the preceding clause, wherein the shaft is a low-pressure shaft, the turbine is a low-pressure turbine, and the compressor is a low-pressure compressor.

The turbine engine of any preceding clause, further comprising a high-pressure shaft, a high-pressure turbine, and a high-pressure compressor. The high-pressure turbine is positioned downstream of the combustor to receive the combustion gases and to rotate the high-pressure turbine. The high-pressure turbine is coupled to the high-pressure shaft to rotate the high-pressure shaft when the high-pressure turbine rotates. The high-pressure compressor is positioned in the core air flow path upstream of the combustor and downstream of the low-pressure compressor. The high-pressure compressor is driven by the high-pressure shaft to compress the core air flowing through the core air flow path and to generate the compressed air.

The turbine engine of any preceding clause, further comprising a secondary air splitter positioned downstream of the fan to split the volume of air into the bypass air and secondary air, the secondary air comprising the core air and the cooling air, the secondary air splitter defining a secondary air inlet.

The turbine engine of any preceding clause, further comprising variable inlet guide vanes positioned in the secondary air inlet and movable to control the volume of air flowing into the secondary air inlet.

The turbine engine of any preceding clause, further comprising a core air splitter positioned downstream of the secondary air inlet to split the secondary air into the core air and the cooling air.

The turbine engine of any preceding clause, wherein the fan is a primary fan, the plurality of fan blades is a plurality of primary fan blades, and the turbine engine further comprises a booster fan positioned downstream of the secondary air inlet, the booster fan including a plurality of booster fan blades that rotates to increase the pressure of the secondary air.

The turbine engine of any preceding clause, wherein each primary fan blade of the plurality of primary fan blades includes an airfoil having a blade length from a root end of the airfoil to a tip end of the airfoil, and each booster fan blade of the plurality of booster fan blades includes an airfoil having a blade length from a root end of the airfoil to a tip end of the airfoil, the blade length of the booster fan blades being from 3.0% to 41.6% of the blade length of the primary fan blades.

The turbine engine of any preceding clause, wherein each of the primary fan blades and each of the booster fan blades are coupled to a fan shaft to rotate with the fan shaft at the same speed.

The turbine engine of any preceding clause, further comprising a gearbox assembly including an input shaft and an output shaft, the gearbox assembly including a plurality of gears to reduce the speed of the output shaft relative to the input shaft, wherein each of the booster fan blades is coupled to a booster fan shaft to rotate with the booster fan shaft at a rotation speed, the booster fan shaft being coupled to the input shaft of the gearbox assembly, and each of the primary fan blades is coupled to a primary fan shaft to rotate with the primary fan shaft, the primary fan shaft being coupled to the output shaft of the gearbox assembly to rotate the primary fan blades at a rotation speed less than the rotation speed of the booster fan blades.

The turbine engine of any preceding clause, wherein the booster fan has a pressure ratio from 1.1 to 1.3.

The turbine engine of any preceding clause, wherein the booster fan has a pressure ratio from 1.3 to 1.7.

The turbine engine of any preceding clause, further comprising an outer turbomachine casing that circumferentially surrounds the turbo-engine and a cooling air casing that circumferentially surrounds the booster fan and defines the cooling air duct between the cooling air casing and the outer turbomachine casing.

The turbine engine of any preceding clause, wherein the secondary air splitter is a forward portion of the cooling air casing.

The turbine engine of any preceding clause, wherein the cooling air duct includes a cooling air outlet positioned downstream of the condenser to discharge the cooling air.

The turbine engine of any preceding clause, wherein the cooling air outlet discharges the cooling air into the bypass airflow passage.

The turbine engine of any preceding clause, wherein the cooling air outlet discharges the cooling air into the core air flow path.

The turbine engine of any preceding clause, further comprising a fan bypass nozzle positioned downstream of the fan to exhaust the bypass air, and at least one core exhaust nozzle positioned downstream of the combustor to exhaust the combustion gases from the turbine engine, wherein the cooling air outlet is an exhaust nozzle separate from the fan bypass nozzle and the at least one core exhaust nozzle.

The turbine engine of any preceding clause, wherein at least one core exhaust nozzle discharges the combustion gases into the bypass airflow passage.

The turbine engine of any preceding clause, further comprising a plurality of outlet guide vanes located in the bypass airflow passage downstream of the fan, the at least one core exhaust nozzle being located in one outlet guide vane of the plurality of outlet guide vanes.

The turbine engine of any preceding clause, further comprising a secondary air splitter positioned downstream of the fan to split the volume of air into the bypass air and secondary air, the secondary air comprising the core air and the cooling air, the secondary air splitter defining a secondary air inlet, wherein the plurality of outlet guide vanes is downstream of the secondary air splitter.

The turbine engine of any preceding clause, wherein the steam system includes a boiler located downstream of the combustor, the boiler receiving the water extracted rom the combustion gases and being fluidly connected to the combustor to receive the combustion gases and to boil the water to generate the steam.

The turbine engine of any preceding clause, wherein the steam system includes a water pump in fluid communication with the condenser and with the boiler to induce the flow of extracted water from the condenser into the boiler.

The turbine engine of any preceding clause, wherein the steam system includes a steam turbine that receives the steam to rotate the steam turbine, the steam turbine being coupled to the turbine shaft to rotate the turbine shaft when the steam turbine rotates.

The turbine engine of any preceding clause, wherein the combustor is fluidly connected to the steam system downstream of the steam turbine to receive the steam after the steam flows through the steam turbine and to inject the steam into the combustor.

The turbine engine of any preceding clause, wherein the combustor is fluidly connected to the steam system to receive the steam and to inject the steam into the combustor.

The turbine engine of any preceding clause, wherein the condenser is located downstream of the combustor to condense water from the combustion gases and to generate an exhaust-water mixture, wherein the steam system includes a water separator located downstream of the condenser relative to a flow of combustion gases to receive the exhaust-water mixture and to separate the water from the exhaust-water mixture.

The turbine engine of any preceding clause, wherein the water separator is located in the cooling air duct.

The turbine engine of any preceding clause, wherein the water separator is located in the cooling air duct upstream of the condenser relative to a flow of the cooling air.

The turbine engine of any preceding clause, wherein the steam system includes a boiler located downstream of the combustor, the boiler being fluidly connected to the water separator to receive the extracted water from the water separator.

The turbine engine of any preceding clause, wherein the steam system includes a water pump in fluid communication with the water separator and with the boiler to induce the flow of water from the water separator into the boiler.

The turbine engine of any preceding clause, wherein the water separator is an inertial separator.

The turbine engine of any preceding clause, wherein the water separator is a cyclonic separator.

A turbine engine comprising a primary fan, a turbo-engine, a nacelle that circumferentially surrounds the primary fan, a cooling air duct, a heat exchanger, a secondary air splitter, and a booster fan. The primary fan includes a plurality of primary fan blades that rotates to increase the pressure of a volume of air. The turbo-engine includes a combustor that combusts compressed air and fuel to generate combustion gases, a turbine including a turbine shaft, the primary fan being coupled to the turbine shaft such that rotation of the turbine causes the primary fan to rotate, and a core air flow path at least partially defined by the combustor and the turbine. The nacelle defines a bypass airflow passage between the nacelle and the turbo-engine. The cooling air duct is defined radially between the core air flow path and the bypass airflow passage. The volume of air from the primary fan is split and flows into the bypass airflow passage as bypass air, flows into the cooling air duct as cooling air, and flows into the core air flow path as core air. The heat exchanger is positioned in the cooling air duct to transfer heat from a heat source from within the turbine engine to the cooling air. The secondary air splitter is positioned downstream of the primary fan to split the volume of air into the bypass air and secondary air. The secondary air comprises the core air and the cooling air. The secondary air splitter defines a secondary air inlet. The booster fan is positioned downstream of the secondary air inlet. The booster fan includes a plurality of booster fan blades that rotates to increase the pressure of the secondary air.

The turbine engine of the preceding clause, wherein the shaft is a low-pressure shaft and the turbine is a low-pressure turbine.

The turbine engine of any preceding clause, the turbo-engine further comprising a compressor that compresses the core air to generate the compressed air, the compressor being coupled to the turbine shaft and defining a portion of the core air flow path.

The turbine engine of any preceding clause, wherein the shaft is a low-pressure shaft, the turbine is a low-pressure turbine, and the compressor is a low-pressure compressor.

The turbine engine of any preceding clause, further comprising a high-pressure shaft, a high-pressure turbine, and a high-pressure compressor. The high pressure turbine is positioned downstream of the combustor to receive the combustion gases and to rotate the high-pressure turbine. The high-pressure turbine is coupled to the high-pressure shaft to rotate the high-pressure shaft when the high-pressure turbine rotates. The high-pressure compressor is positioned in the core air flow path upstream of the combustor and downstream of the low-pressure compressor. The high-pressure compressor is driven by the high-pressure shaft to compress the core air flowing through the core air flow path and to generate the compressed air.

The turbine engine of any preceding clause, further comprising variable inlet guide vanes positioned in the secondary air inlet and movable to control the volume of air flowing into the secondary air inlet.

The turbine engine of any preceding clause, further comprising a core air splitter positioned downstream of the secondary air inlet to split the secondary air into the core air and the cooling air.

The turbine engine of any preceding clause, wherein each primary fan blade of the plurality of primary fan blades includes an airfoil having a blade length from a root end of the airfoil to a tip end of the airfoil, and each booster fan blade of the plurality of booster fan blades includes an airfoil having a blade length from a root end of the airfoil to a tip end of the airfoil, the blade length of the booster fan blades being from 3.0% to 41.6% of the blade length of the primary fan blades.

The turbine engine of any preceding clause, wherein the plurality of primary fan blades and the plurality of booster fan blades are coupled to a fan shaft to rotate with the fan shaft at the same speed.

The turbine engine of any preceding clause, wherein the plurality of primary fan blades is coupled to a fan shaft and the plurality of booster fan blades is coupled to a booster fan shaft, wherein the fan shaft and the booster fan shaft rotate at different speeds.

The turbine engine of any preceding clause, further comprising gearbox assembly including an input shaft and an output shaft, the gearbox assembly including a plurality of gears to reduce the speed of the output shaft relative to the input shaft, wherein each of the booster fan blades is coupled to a booster fan shaft to rotate with the booster fan shaft at a rotation speed, the booster fan shaft being coupled to the input shaft of the gearbox assembly, and wherein each of the primary fan blades is coupled to a primary fan shaft to rotate with the primary fan shaft, the primary fan shaft being coupled to the output shaft of the gearbox assembly to rotate the primary fan blades at a rotation speed less than the rotation speed of the booster fan blades.

The turbine engine of any preceding clause, wherein the booster fan has a pressure ratio from 1.1 to 1.3.

The turbine engine of any preceding clause, wherein the booster fan has a pressure ratio from 1.3 to 1.7.

The turbine engine of any preceding clause, further comprising an outer turbomachine casing that circumferentially surrounds the turbo-engine, and a cooling air casing that circumferentially surrounds the booster fan and defines the cooling air duct between the cooling air casing and the outer turbomachine casing.

The turbine engine of any preceding clause, wherein the secondary air splitter is a forward portion of the cooling air casing.

The turbine engine of any preceding clause, wherein the cooling air duct includes a cooling air outlet positioned downstream of the heat exchanger to discharge the cooling air.

The turbine engine of any preceding clause, wherein the cooling air outlet discharges the cooling air into the bypass airflow passage.

The turbine engine of any preceding clause, wherein the cooling air outlet discharges the cooling air into the core air flow path.

The turbine engine of any preceding clause, further comprising a fan bypass nozzle positioned downstream of the primary fan to exhaust the bypass air, and at least one core exhaust nozzle positioned downstream of the combustor to exhaust the combustion gases from the turbine engine, wherein the cooling air outlet is an exhaust nozzle separate from the fan bypass nozzle and the at least one core exhaust nozzle.

The turbine engine of any preceding clause, wherein the heat exchanger is a condenser.

The turbine engine of any preceding clause, further comprising a steam system that extracts water from the combustion gases, vaporizes the water to generate steam, and injects the steam into the core air flow path, the steam system including the condenser to transfer heat from the combustion gases to the cooling air and to condense the water from the combustion gases.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A turbine engine comprising:
    a primary fan including a plurality of primary fan blades that rotates to increase a pressure of a volume of air;
    a secondary air splitter positioned downstream of the primary fan to split the volume of air into bypass air and secondary air, the secondary air splitter defining a secondary air inlet;
    a booster fan positioned downstream of the secondary air inlet, the booster fan including a plurality of booster fan blades that rotates to increase a pressure of the secondary air;
    a core air splitter positioned downstream of the booster fan to split the secondary air into cooling air and core air;
    a turbo-engine including:
        a combustor that combusts compressed air and fuel to generate combustion gases;
        a turbine including a turbine shaft, the primary fan coupled to the turbine shaft such that rotation of the turbine causes the primary fan to rotate; and
        a core air flow path at least partially defined by the combustor and the turbine, the core air flowing into the core air flow path;
    a nacelle that circumferentially surrounds the primary fan, the nacelle defining a bypass airflow passage between the nacelle and the turbo-engine, the bypass air flowing through the bypass airflow passage;
    a cooling air duct defined radially between the core air flow path and the bypass airflow passage, the cooling air flowing into the cooling air duct; and
    a steam system that extracts water from the combustion gases, vaporizes the water to generate steam, and injects the steam into the core air flow path, the steam system including a condenser positioned in the cooling air duct to transfer heat from the combustion gases to the cooling air and to condense the water from the combustion gases.

2. The turbine engine of claim 1, wherein the steam system includes a boiler located downstream of the combustor, the boiler receiving the water extracted from the combustion gases and being fluidly connected to the combustor to receive the combustion gases and to boil the water to generate the steam.

3. The turbine engine of claim 1, wherein the combustor is fluidly connected to the steam system to receive the steam and to inject the steam into the combustor.

4. The turbine engine of claim 1, wherein at least one core exhaust nozzle discharges the combustion gases into the bypass airflow passage.

5. The turbine engine of claim 4, further comprising a plurality of outlet guide vanes located in the bypass airflow passage downstream of the primary fan, the at least one core exhaust nozzle being located in at least one outlet guide vane of the plurality of outlet guide vanes.

6. The turbine engine of claim 1, wherein the steam system further includes a steam turbine that receives the steam to rotate the steam turbine, the steam turbine being coupled to the turbine shaft to rotate the turbine shaft when the steam turbine rotates.

7. The turbine engine of claim 6, wherein the combustor is fluidly connected to the steam system downstream of the steam turbine to receive the steam after the steam flows through the steam turbine and to inject the steam into the combustor.

8. The turbine engine of claim 1, wherein the condenser is located downstream of the combustor to condense water from the combustion gases and to generate an exhaust-water mixture,
    wherein the steam system further includes a water separator located downstream of the condenser relative to a flow of combustion gasses to receive the exhaust-water mixture and to separate the water from the exhaust-water mixture.

9. The turbine engine of claim 8, wherein the water separator is located in the cooling air duct upstream of the condenser relative to a flow of the cooling air.

10. The turbine engine of claim 1, further comprising variable inlet guide vanes positioned in the secondary air inlet and movable to control the volume of air flowing into the secondary air inlet.

11. The turbine engine of claim 1, wherein the plurality of primary fan blades and the plurality of booster fan blades are coupled to a fan shaft to rotate with the fan shaft at the same speed.

12. The turbine engine of claim 1, wherein the plurality of primary fan blades is coupled to a primary fan shaft and the plurality of booster fan blades is coupled to the turbine shaft, wherein the primary fan shaft and the turbine shaft rotate at different speeds.

13. The turbine engine of claim 12, further comprising a gearbox assembly including the turbine shaft as an input shaft and the primary fan shaft as an output shaft, the gearbox assembly including a plurality of gears to reduce the speed of the primary fan shaft relative to the turbine shaft, to rotate the primary fan blades at a rotation speed less than a rotation speed of the booster fan blades.

14. The turbine engine of claim 1, wherein the booster fan has a pressure ratio from 1.1 to 1.3.

15. The turbine engine of claim 1, wherein the booster fan has a pressure ratio from 1.3 to 1.7.

16. The turbine engine of claim 1, wherein the cooling air duct includes a cooling air outlet positioned downstream of the condenser to discharge the cooling air, the cooling air outlet discharging the cooling air into the bypass airflow passage.

17. The turbine engine of claim 1, wherein the cooling air duct includes a cooling air outlet positioned downstream of the condenser to discharge the cooling air, the cooling air outlet discharging the cooling air into the core air flow path.

18. The turbine engine of claim 1, further comprising:
a fan bypass nozzle positioned downstream of the primary fan to exhaust the bypass air; and
at least one core exhaust nozzle positioned downstream of the combustor to exhaust the combustion gases from the turbine engine,
wherein the cooling air duct includes a cooling air outlet that is an exhaust nozzle separate from the fan bypass nozzle and the at least one core exhaust nozzle.

19. The turbine engine of claim 1, wherein the turboengine further includes a compressor that compresses the core air to generate the compressed air, the compressor being coupled to the turbine shaft and defining a portion of the core air flow path.

20. The turbine engine of claim 1, wherein each primary fan blade of the plurality of primary fan blades includes an airfoil having a blade length from a root end of the airfoil to a tip end of the airfoil, and each booster fan blade of the plurality of booster fan blades includes an airfoil having a blade length from a root end of the airfoil to a tip end of the airfoil, the blade length of the booster fan blades being from 3.0% to 41.6% of the blade length of the primary fan blades.

* * * * *